United States Patent
Liu et al.

(10) Patent No.: US 12,219,547 B2
(45) Date of Patent: Feb. 4, 2025

(54) METHOD, NETWORK DEVICE AND NETWORK NODE FOR SCHEDULING TERMINAL DEVICES

(71) Applicant: Telefonaktiebolaget LM Ericsson (publ), Stockholm (SE)

(72) Inventors: Chunhui Liu, Beijing (CN); Yongqian Chen, Beijing (CN); Bin Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 17/614,861

(22) PCT Filed: May 29, 2019

(86) PCT No.: PCT/CN2019/088999
§ 371 (c)(1),
(2) Date: Nov. 29, 2021

(87) PCT Pub. No.: WO2020/237526
PCT Pub. Date: Dec. 3, 2020

(65) Prior Publication Data
US 2022/0225345 A1 Jul. 14, 2022

(51) Int. Cl.
*H04W 72/12* (2023.01)
*H04W 72/121* (2023.01)

(52) U.S. Cl.
CPC ................. *H04W 72/121* (2013.01)

(58) Field of Classification Search
CPC .................................. H04W 72/121
USPC ........................................ 370/329
See application file for complete search history.

(56) References Cited

U.S. PATENT DOCUMENTS

| | | | | |
|---|---|---|---|---|
| 9,198,078 | B1* | 11/2015 | Vivanco | H04L 1/1896 |
| 2015/0331771 | A1* | 11/2015 | Conway | H04W 24/06 |
| | | | | 714/704 |
| 2017/0339523 | A1* | 11/2017 | Hamahata | H04W 4/023 |
| 2018/0375957 | A1* | 12/2018 | Lv | H04W 72/54 |
| 2019/0268206 | A1* | 8/2019 | Yang | H04L 5/0051 |
| 2020/0213817 | A1* | 7/2020 | Lin | H04W 4/08 |

FOREIGN PATENT DOCUMENTS

| | | |
|---|---|---|
| WO | 2012173623 A1 | 12/2012 |
| WO | 2015007665 A1 | 1/2015 |

OTHER PUBLICATIONS

Sharma, et al., "Towards Massive Machine Type Communications in Ultra-Dense Cellular IoT Networks: Current Issues and Machine Learning-Assisted Solutions," IEEE Communications Surveys and Tutorials, Aug. 2018, 37 pages.

(Continued)

*Primary Examiner* — Gbemileke J Onamuti
(74) *Attorney, Agent, or Firm* — Sage Patent Group

(57) ABSTRACT

The present disclosure provides a method in a network device for scheduling terminal devices. The method includes: determining a grouping policy based on one or more attributes of terminal devices served by the network device in a previous time period; dividing terminal devices to be scheduled into a number of groups in accordance with the grouping policy; assigning a set of resources to each of the groups; and scheduling the terminal devices to be scheduled in each of the groups in the set of resources assigned to that group.

20 Claims, 10 Drawing Sheets

(56) References Cited

OTHER PUBLICATIONS

Wu, et al., "Random Access and Resource Allocation for the Coexistance of NOMA-Based and OMA-Based M2M communications," China Communications, vol. 14, Issue 6, Jun. 2017, pp. 43-53.
Extended European Search Report for European Patent Application No. 19931105.1, mailed Dec. 13, 2022, 18 pages.
Author Uknown, "Technical Specification Group Radio Access Network; NR; User Equipment (UE) radio transmission and reception; Part 1: Range 1 Standalone (Release 15)," Technical Specification 38.101, Version 15.4.0, Dec. 2018, 3GPP Organizational Partners, 230 pages.
Author Unkown, "Technical Specification Group Radio Access Network; NR; User Equipment (UE) radio transmission and reception; Part 2: Range 2 Standalone (Release 15)," Technical Specification 38.101-2, Version 15.4.0, Dec. 2018, 3GPP Organizational Partners, 131 pages.
Bishop, Christopher, "Pattern Recognition and Machine Learning," (book), 2006, Springer, Singapore, 758 pages.
International Search Report and Written Opinion for International Patent Application No. PCT/CN2019/088999, mailed Feb. 19, 2020, 10 pages.
Author Unknown, "Technical Specification Group Radio Access Network; NR; Physical channels and modulation (Release 15)," 3GPP Technical Specification 38.211, Version 15.1.0, Mar. 2018, 3GPP Organizational Partners, 90 pages.

* cited by examiner

METHOD, NETWORK DEVICE AND NETWORK NODE FOR SCHEDULING TERMINAL DEVICES

This application is a 35 U.S.C. § 371 national phase filing of International Application No. PCT/CN2019/088999, filed May 29, 2019, the disclosure of which is incorporated herein by reference in its entirety.

TECHNICAL FIELD

The present disclosure relates to wireless communication, and more particularly, to a method, a network device and a network node for scheduling terminal devices.

BACKGROUND

The 5th Generation (5G) wireless systems feature wireless technologies including: millimeter wave (mmW) bands (e.g., at 26, 28, 38 and 60 GHz), capable of providing data rates as high as 20 gigabits per second; massive Multiple Input Multiple Output (MIMO) (e.g., with 64-256 antennas), capable of providing a throughput up to ten times higher than that of the current $4^{th}$ Generation (4G) Long Term Evolution (LTE) systems; and "Low-band 5G" and "Mid-band 5G", capable of using frequencies from 600 MHz to 6 GHz to significantly improve the performance, flexibility, scalability and efficiency of the current mobile networks, so as to utilize available spectrums, licensed, shared or unlicensed, across a wide variety of spectrum bands.

Frequency bands for the 5G New Radio (NR) are divided into two different frequency ranges. Frequency Range 1 (FR1) includes sub-6 GHz frequency bands, some of which are traditionally used by previous standards. Frequency Range 2 (FR2) includes frequency bands above 24 GHz and into the mmW range, which have smaller coverage but higher available bandwidth than FR1, with the bandwidth and the number of Physical Resource Blocks (PRBs) increased to up to 400 MHz and 273, respectively. Accordingly, the NR will have more scheduling units in frequency domain, e.g., PRBs or sub-carriers, than the LTE systems.

On the other hand, Massive MIMO may use a very large number (e.g., hundreds or thousands) of antennas operating coherently and adaptively. Extra antennas can focus transmission and reception of signal energy into even narrower spatial areas. This brings huge improvements in throughput and energy efficiency, in particular when combined with simultaneous scheduling of a large number (e.g., tens or hundreds) of terminal devices. Multi-user massive MIMO can provide a large number of users (devices) in a condensed area with high data rates and consistent performances simultaneously. With the employment of massive MIMO, the NR will have more scheduling units in spatial domain, e.g., spatial layers, than the LTE systems.

In practice, only a limited number of terminal devices can be scheduled per transmission opportunity. While a Transmission Time Interval (TTI) in the LTE is 1 ms, a scheduling interval in the NR may be reduced to 0.5 ms for the numerology having a Sub-Carrier Spacing (SCS) of 30 KHz, or to 0.25 ms for the numerology having an SCS of 60 KHz. Thus, the computational complexity for scheduling of terminal devices in the NR increases as the scheduling interval and thus the allowable computing time decreases by half or even more. Moreover, conventionally, terminal devices are scheduled sequentially, meaning that a scheduling result, e.g., the number of PRBs or the starting PRB, for a terminal device may depend on a scheduling result for a terminal device scheduled previously. As a result, while the NR 5G has much more radio resources (or much more scheduling units, e.g., PRBs and layers) than the LTE, the number of terminal devices that can be scheduled per scheduling interval may be limited, which may in turn limit the system capacity. In other words, the radio resource utilization may be inefficient, particularly when there are many terminal devices having small data transmissions.

SUMMARY

It is an object of the present disclosure to provide a method, a network device and a network node for scheduling terminal devices, capable of achieving an improved radio resource utilization.

According to a first aspect of the present disclosure, a method in a network device for scheduling terminal devices is provided. The method includes: determining a grouping policy based on one or more attributes of terminal devices served by the network device in a previous time period; dividing terminal devices to be scheduled into a number of groups in accordance with the grouping policy; assigning a set of resources to each of the groups; and scheduling the terminal devices to be scheduled in each of the groups in the set of resources assigned to that group.

In an embodiment, the operation of determining the grouping policy may include determining one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include Guaranteed Bit Rate (GBR) service and non-GBR service; and/or the channel conditions may include Signal to Interference plus Noise Ratio (SINR), Reference Signal Received Power (RSRP) or Reference Signal Received Quality (RSRQ).

In an embodiment, the operation of assigning may include dividing total available resources evenly into the number of sets of resources and assigning each set of resources to one of the groups.

In an embodiment, the operation of assigning may include: calculating a Probability Density Function (PDF) of historical resource requirements of the terminal devices served by the network device in the previous time period; and dividing total available resources into the number of sets of resources based on the PDF, and assigning each set of resources to one of the groups.

In an embodiment, the operation of scheduling may include, for at least one of the groups: allocating the set of resources assigned to each of the at least one group to the terminal devices to be scheduled in that group with a periodicity.

In an embodiment, for each of the at least one group, the periodicity may be dependent on a maximum allowable delay for that group.

In an embodiment, the method may further include, for each of the at least one group: adjusting the maximum allowable delay for that group based on a resource utilization for that group.

In an embodiment, the method may further include: adjusting the grouping policy and/or the set of resources assigned to each of the groups based on a resource utilization for each of the groups.

In an embodiment, the method may further include, for each of the groups: calculating a number of Control Channel Elements (CCEs) required for scheduling the terminal devices to be scheduled in that group; and determining a size of Control Resource Set (CORESET) based on the number of CCEs.

In an embodiment, the terminal devices to be scheduled in each of the groups may be scheduled sequentially.

In an embodiment, the terminal devices to be scheduled in at least one of the groups may be scheduled in parallel with the terminal devices to be scheduled in at least another one of the groups.

In an embodiment, the resources may include resources in time, frequency and/or spatial domain.

According to a second aspect of the present disclosure, a network device is provided. The network device includes a transceiver, a processor and a memory. The memory contains instructions executable by the processor whereby the network device is operative to perform the method according to the above first aspect.

According to a third aspect of the present disclosure, a computer readable storage medium having computer program instructions stored thereon, the computer program instructions, when executed by a processor in a network device, causing the network device to perform the method according to the above first aspect.

According to a fourth aspect of the present disclosure, a method in a network node for scheduling terminal devices is provided. The method includes: determining a grouping policy based on one or more attributes of terminal devices served by a network device in a previous time period, for dividing terminal devices to be scheduled by the network device into a number of groups; assigning a set of resources to each of the groups; and initiating scheduling of the terminal devices to be scheduled in each of the groups in the set of resources assigned to that group.

In an embodiment, the operation of determining the grouping policy may include determining one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include GBR service and non-GBR service; and/or the channel conditions may include SINR, RSRP or RSRQ.

In an embodiment, the operation of assigning may include dividing total available resources evenly into the number of sets of resources and assigning each set of resources to one of the groups.

In an embodiment, the operation of assigning may include: calculating a PDF of historical resource requirements of the terminal devices served by the network device in the previous time period; and dividing total available resources into the number of sets of resources based on the PDF, and assigning each set of resources to one of the groups.

In an embodiment, the method may further include: adjusting the grouping policy and/or the set of resources assigned to each of the groups based on a resource utilization for each of the groups.

In an embodiment, the method may further include, for each of the groups: calculating a number of CCEs required for scheduling the terminal devices to be scheduled in that group; and determining a size of CORESET based on the number of CCEs.

In an embodiment, the resources may include resources in time, frequency and/or spatial domain.

According to a fifth aspect of the present disclosure, a network node is provided. The network node includes a transceiver, a processor and a memory. The memory contains instructions executable by the processor whereby the network node is operative to perform the method according to the above fourth aspect.

According to a sixth aspect of the present disclosure, a computer readable storage medium having computer program instructions stored thereon, the computer program instructions, when executed by a processor in a network node, causing the network node to perform the method according to the above fourth aspect.

With the embodiments of the present disclosure, a grouping policy can be determined based on one or more attributes of terminal devices served by the network device in a previous time period, such that terminal devices to be scheduled can be divided into a number of groups in accordance with the grouping policy. A set of resources can be assigned to each of the groups, and the terminal devices to be scheduled in each of the groups can be scheduled in the set of resources assigned to that group. In this way, resources can be allocated to terminal device groups depending on statistics of attributes of terminal devices served by a network device, such that an improved radio resource utilization can be achieved.

BRIEF DESCRIPTION OF THE DRAWINGS

The above and other objects, features and advantages will be more apparent from the following description of embodiments with reference to the figures, in which.

DETAILED DESCRIPTION

Figure 1:
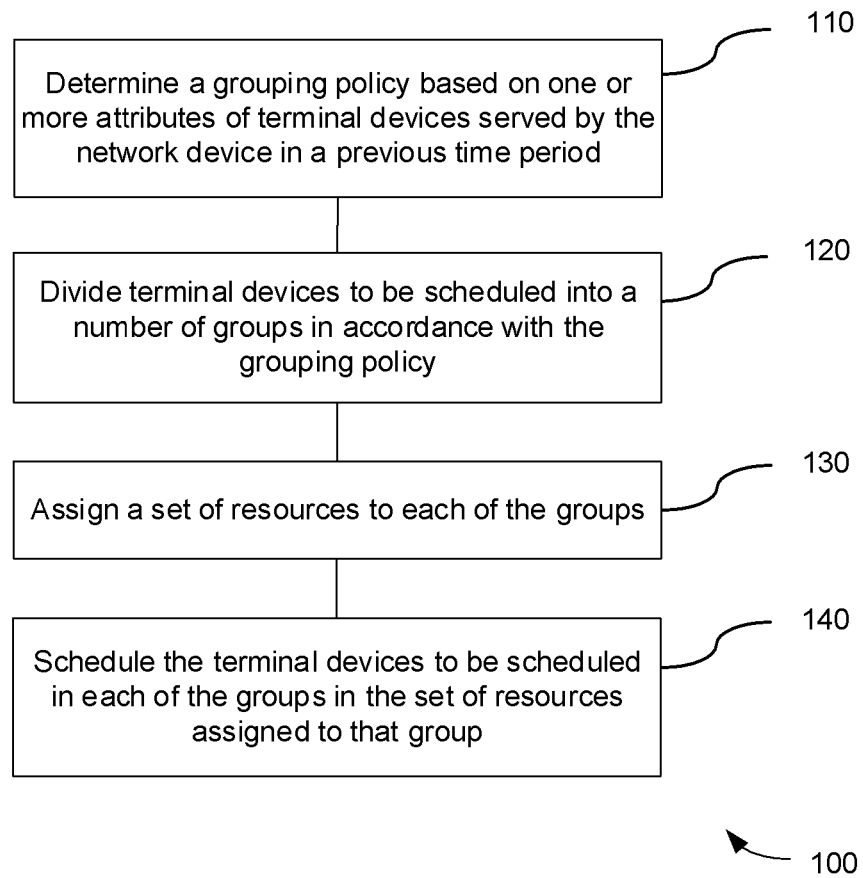
FIG. 1 is a flowchart illustrating a method for scheduling terminal devices according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "network node" refers to a device connected to a network node such as a BS or an AP, e.g., via any appropriate network. For example, the network node may refer to a cloud server, a cloud computing node or any other node capable of data processing, computing and/or communicating information with one or more network devices.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes"

and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for scheduling terminal devices according to an embodiment of the present disclosure. The method 100 can be performed at a network device, e.g., an eNB or gNB.

At block 110, a grouping policy is determined based on one or more attributes of terminal devices served by the network device in a previous time period. Here, the grouping policy can be determined by means of machine learning.

In the block 110, the grouping policy may include one or more of: a number of groups (denoted as N, where N is a positive integer), a maximum number of terminal devices in each of the groups, or at least one of the one or more attributes that is associated with each of the groups. The one or more attributes may include service types, buffer sizes or channel conditions. For example, the service types may include Guaranteed Bit Rate (GBR) service, such as voice service, and non-GBR service, such as video service, web browsing, file download, etc. The channel conditions may include SINR, RSRP, RSRQ or any other metrics associated with channel conditions or channel qualities.

At block 120, terminal devices to be scheduled are divided into N groups in accordance with the grouping policy. As described above, N can be indicated in the grouping policy. When the grouping policy further indicates at least one attribute associated with each group, the terminal devices to be scheduled can be divided into N groups based further on the at least one attribute associated with each group. For example, according to the grouping policy, Group A can be associated with GBR service and a high SINR (e.g., higher than a predefined threshold) and Group B can be associated with non-GBR service and a large buffer size (e.g., larger than a predefined threshold). In this case, each terminal device to be scheduled can be assigned to one of the groups when it has the attribute(s) matching the attribute(s) associated with that group (e.g., Terminal T1 having GBR service and a high SINR will be assigned to Group A and Terminal T2 having non-GBR service and a large buffer size will be assigned to Group B).

At block 130, a set of resources is assigned to each of the groups. Here, the resources may include resources in time, frequency and/or spatial domain. For example, the resources may include scheduling units such as time slots, PRBs and/or layers.

In an example, in the block 130, total available resources can be divided evenly into N sets of resources and each set of resources can be assigned to one of the groups. For example, assuming that the resources are PRBs and there are in total 200 PRBs available and N=4, each group can simply have 200/4=50 PRBs, in which case the granularity for PRB assignment is 50.

In an example, in the block 130, a Probability Density Function (PDF) of historical resource requirements of the terminal devices served by the network device in the previous time period can be calculated, and total available resources can be divided into N sets of resources based on the PDF, and then each set of resources can be assigned to one of the groups. For example, assuming that the resources are PRBs, the resource requirement (i.e., the number of PRBs required) for a terminal device can be calculated as:

$$C = \min\left(\max\left(\frac{D}{LTB\log(1+S)}, 1\right), C_{max}\right) \quad (1)$$

where C denotes the number of PRBs required by the terminal device, $C_{max}$ denotes the total number of available PRBs, D denotes the buffer size of the terminal device, L denotes the number of layers (i.e., rank), T denotes a transmission duration, B denotes a bandwidth of each PRB, S denotes an SINR of a channel (either downlink or uplink) associated with the terminal device. Then, the PDF of C values of the terminal devices served by the network device in the previous time period can be calculated. For example, the total available resources can be divided into N sets of PRBs to be assigned to the N groups of terminal device, respectively, such that a group of terminal devices having a higher PDF can be provided with a finer granularity of PRB assignment.

It is to be noted here that the block 130 may be performed before, after or in parallel with the block 120.

At block 140, the terminal devices to be scheduled in each of the groups are scheduled in the set of resources assigned to that group. That is, the set of resources assigned to each group is allocated to the terminal devices to be scheduled in that group.

In an example, in the block 140, for at least one of the groups, the set of resources assigned to each of the at least one group can be allocated to the terminal devices to be scheduled in that group with a periodicity (denoted as $T_n$), which can be dependent on a maximum allowable delay for that group (the value of $T_n$ may also depend on a validity period of the grouping policy determined in the block 110). For example, assuming that a GBR service, e.g., a voice service, requires a maximum round-trip delay of 80 ms, for a group associated with the service, the periodicity of scheduling (or resource allocation) can be set to $T_n$=40 ms. Assuming that the number of PRBs required by each terminal device in the group is C as calculated according to Equation (1) above and there are $t_n$ scheduling opportunities within $T_n$, the minimum number of terminal devices to be scheduled at each scheduling opportunity can be calculated as $m/t_n$, where m denotes the number of terminal devices in the group. Similarly, for a group associated with a non-GBR service, the periodicity of scheduling (or resource allocation) may depend on a maximum allowable delay for the non-GBR service. In an example, the maximum allowable delay for a particular group can be adjusted based on a resource utilization for the group. For example, when the resource utilization for the group is lower than a predefined threshold, e.g., when a ratio of scheduling units that are not allocated to any terminal devices to the total available scheduling units within $T_n$ is higher than a predefined threshold, the maximum allowable delay for the group can be reduced.

For at least one of the N groups, e.g., a group of terminal devices having large buffer sizes and high SINR and requiring a large amount of resources, the scheduling (or resource allocation) may not be periodic and as many resources as possible can be allocated to the terminal devices in that group.

In an example, the grouping policy and/or the set of resources assigned to each of the groups can be adjusted based on a resource utilization for each of the groups. For example, when the resource utilization for a particular group is lower than a predefined threshold, less resources can be assigned to the group. In another example, when the resource utilization for one or more groups is lower than a predefined threshold, the grouping policy can be adjusted to provide more groups.

Here, in an example, the terminal devices to be scheduled in each of the groups can be scheduled sequentially. The terminal devices to be scheduled in at least one of the groups can be scheduled in parallel with the terminal devices to be scheduled in at least another one of the groups.

In an example, for each of the N groups, a number of Control Channel Elements (CCEs) required for scheduling the terminal devices to be scheduled in that group can be calculated, and a size of Control Resource Set (CORESET) (Physical Downlink Control Channel (PDCCH)) can be determined based on the number of CCEs, such that more resources can be used for data traffic, e.g., for Physical Downlink Shared Channel (PDSCH) or Physical Uplink Shared Channel (PUSCH).

One or more of the above blocks in the method 100 can be moved to a "cloud", so as to e.g., reduce computational complexity and/or storage requirement at the network device.

Figure 2:
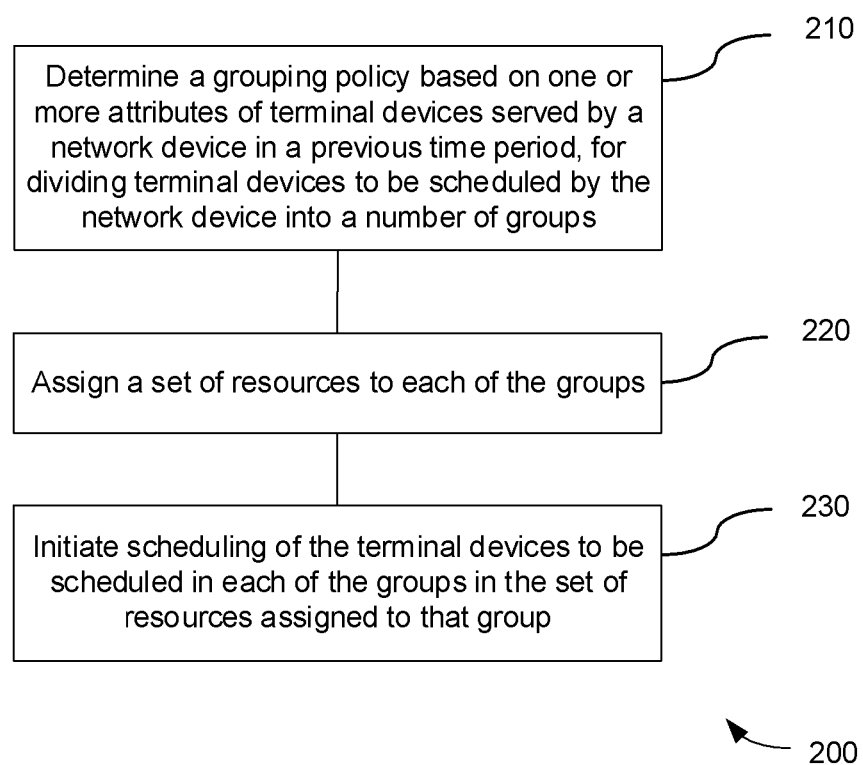
FIG. 2 is a flowchart illustrating a method for scheduling terminal devices according to another embodiment of the present disclosure.

FIG. 2 is a flowchart illustrating a method 200 for scheduling terminal devices according to another embodiment of the present disclosure. The method 200 can be performed at a network node, e.g., a cloud server or a cloud computing node, connected to a network device.

At block 210, a grouping policy is determined based on one or more attributes of terminal devices served by the network device in a previous time period, for dividing terminal devices to be scheduled by the network device into a number of groups. For example, the attributes can be collected from the network device and stored at the network node.

As described above in connection with the method 100, the grouping policy may include one or more of: a number (N) of groups, a maximum number of terminal devices in each of the groups, or at least one of the one or more attributes that is associated with each of the groups. The one or more attributes may include service types, buffer sizes or channel conditions. For example, the service types may include GBR service and non-GBR service, including e.g., voice service, video service, web browsing, file download, etc. The channel conditions may include SINR, RSRP, RSRQ or any other metrics associated with channel conditions or channel qualities.

At block 220, a set of resources is assigned to each of the groups. Here, the resources may include resources in time, frequency and/or spatial domain. For example, the resources may include scheduling units such as time slots, PRBs and/or layers.

In an example, in the block 220, total available resources can be divided evenly into N sets of resources and each set of resources can be assigned to one of the groups. Alternatively, a PDF of historical resource requirements of the terminal devices served by the network device in the previous time period can be calculated, and total available resources can be divided into N sets of resources based on the PDF, and then each set of resources can be assigned to one of the groups.

At block 230, scheduling of the terminal devices to be scheduled in each of the groups in the set of resources assigned to that group is initiated. For example, the network node can transmit to the network device a scheduling instruction containing information on the grouping policy and the assignment of resources, such that the network device can divide the terminal devices to be scheduled into N groups (e.g., referring to the block 120 of the method 100) and schedule the terminal devices to be scheduled in each of the groups in the set of resources assigned to that group (e.g., referring to the block 140 of the method 100).

In an example, the grouping policy and/or the set of resources assigned to each of the groups can be adjusted based on a resource utilization for each of the groups. For example, the network node can receive a report regarding the resource utilization from the network device, and transmit information on the adjusted grouping policy and/or assignment of resources to the network device.

In an example, for each of the groups, a number of CCEs required for scheduling the terminal devices to be scheduled in that group can be calculated, and a size of CORESET can be determined based on the number of CCEs. For example, the network node can transmit the determined size of CORESET to the network device.

Figure 3:
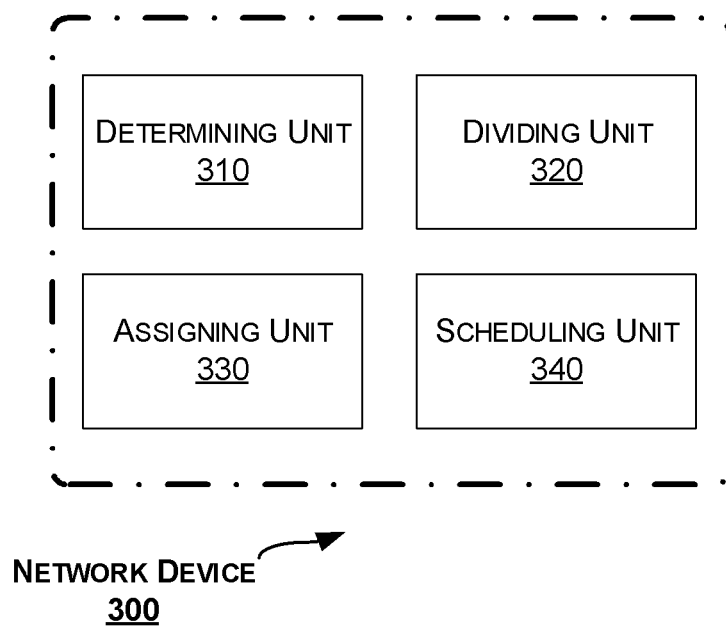
FIG. 3 is a block diagram of a network device according to an embodiment of the present disclosure.

Correspondingly to the method 100 as described above, a network device is provided. FIG. 3 is a block diagram of a network device 300 according to an embodiment of the present disclosure. The network device 300 can be e.g., an eNB or gNB.

As shown in FIG. 3, the network device 300 includes a determining unit 310 configured to determine a grouping policy based on one or more attributes of terminal devices served by the network device in a previous time period. The network device 300 further includes a dividing unit 320 configured to divide terminal devices to be scheduled into a number of groups in accordance with the grouping policy. The network device 300 further includes an assigning unit 330 configured to assign a set of resources to each of the groups. The network device 300 further includes a scheduling unit 340 configured to schedule the terminal devices to be scheduled in each of the groups in the set of resources assigned to that group.

In an embodiment, the determining unit 310 can be configured to determine one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include GBR service and non-GBR service; and/or the channel conditions may include SINR, RSRP or RSRQ.

In an embodiment, the assigning unit 330 can be configured to divide total available resources evenly into the number of sets of resources and assign each set of resources to one of the groups.

In an embodiment, the assigning unit 330 can be configured to calculate a PDF of historical resource requirements of the terminal devices served by the network device in the previous time period; and divide total available resources into the number of sets of resources based on the PDF, and assign each set of resources to one of the groups.

In an embodiment, the scheduling unit 340 can be configured to, for at least one of the groups: allocate the set of resources assigned to each of the at least one group to the terminal devices to be scheduled in that group with a periodicity.

In an embodiment, for each of the at least one group, the periodicity may be dependent on a maximum allowable delay for that group.

In an embodiment, the network device 300 may further include an adjusting unit configured to, for each of the at least one group: adjust the maximum allowable delay for that group based on a resource utilization for that group.

In an embodiment, the determining unit 310 can be further configured to adjust the grouping policy based on a resource utilization for each of the groups. Additionally or alternatively, the assigning unit 330 can be further configured to adjust the set of resources assigned to each of the groups based on a resource utilization for each of the groups.

In an embodiment, the network device 300 may further include a calculating unit configured to, for each of the groups: calculate a number of CCEs required for scheduling the terminal devices to be scheduled in that group; and determine a size of CORESET based on the number of CCEs.

In an embodiment, the terminal devices to be scheduled in each of the groups may be scheduled sequentially.

In an embodiment, the terminal devices to be scheduled in at least one of the groups may be scheduled in parallel with the terminal devices to be scheduled in at least another one of the groups.

In an embodiment, the resources may include resources in time, frequency and/or spatial domain.

The determining unit 310, the dividing unit 320, the assigning unit 330 and the scheduling unit 340 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
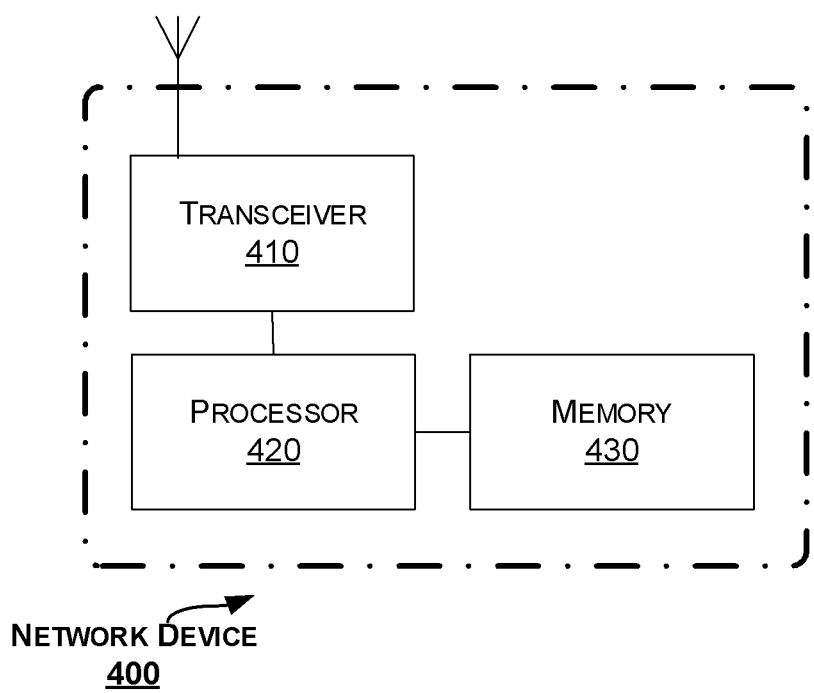
FIG. 4 is a block diagram of a network device according to another embodiment of the present disclosure.

FIG. 4 is a block diagram of a network device 400 according to another embodiment of the present disclosure.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 1. Particularly, the memory 430 contains instructions executable by the processor 420 whereby the network device 400 is operative to: determine a grouping policy based on one or more attributes of terminal devices served by the network device in a previous time period; divide terminal devices to be scheduled into a number of groups in accordance with the grouping policy; assign a set of resources to each of the groups; and schedule the terminal devices to be scheduled in each of the groups in the set of resources assigned to that group.

In an embodiment, the operation of determining the grouping policy may include determining one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include GBR service and non-GBR service; and/or the channel conditions may include SINR, RSRP or RSRQ.

In an embodiment, the operation of assigning may include dividing total available resources evenly into the number of sets of resources and assigning each set of resources to one of the groups.

In an embodiment, the operation of assigning may include: calculating a PDF of historical resource requirements of the terminal devices served by the network device in the previous time period; and dividing total available resources into the number of sets of resources based on the PDF, and assigning each set of resources to one of the groups.

In an embodiment, the operation of scheduling may include, for at least one of the groups: allocating the set of resources assigned to each of the at least one group to the terminal devices to be scheduled in that group with a periodicity.

In an embodiment, for each of the at least one group, the periodicity may be dependent on a maximum allowable delay for that group.

In an embodiment, the method may further include, for each of the at least one group: adjusting the maximum allowable delay for that group based on a resource utilization for that group.

In an embodiment, the memory 430 may further contain instructions executable by the processor 420 whereby the network device 400 is operative to: adjust the grouping policy and/or the set of resources assigned to each of the groups based on a resource utilization for each of the groups.

In an embodiment, the memory 430 may further contain instructions executable by the processor 420 whereby the network device 400 is operative to: for each of the groups: calculate a number of CCEs required for scheduling the terminal devices to be scheduled in that group; and determine a size of CORESET based on the number of CCEs.

In an embodiment, the terminal devices to be scheduled in each of the groups may be scheduled sequentially.

In an embodiment, the terminal devices to be scheduled in at least one of the groups may be scheduled in parallel with the terminal devices to be scheduled in at least another one of the groups.

In an embodiment, the resources may include resources in time, frequency and/or spatial domain.

Figure 5:
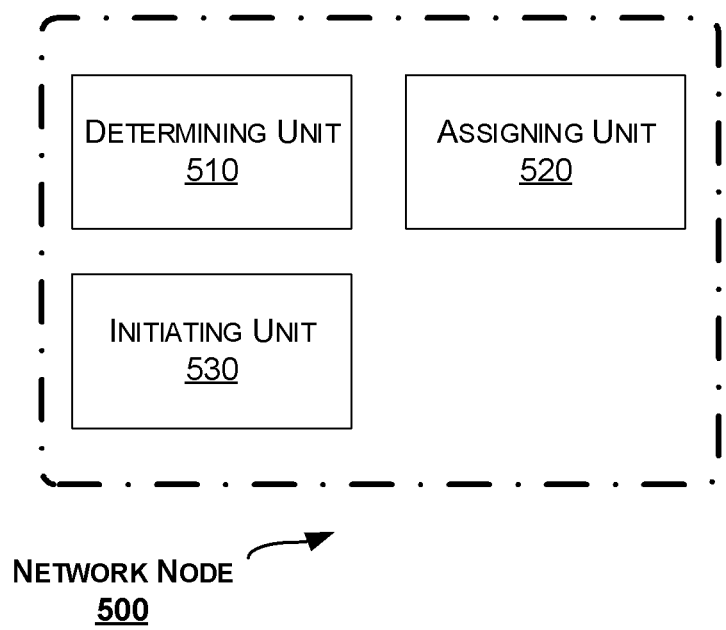
FIG. 5 is a block diagram of a network node according to an embodiment of the present disclosure.

Correspondingly to the method 200 as described above, a network device is provided. FIG. 5 is a block diagram of a network node 500 according to an embodiment of the present disclosure. The network node 500 can be e.g., a cloud server or a cloud computing node connected to a network device.

As shown in FIG. 5, the network node 500 includes a determining unit 510 configured to determine a grouping policy based on one or more attributes of terminal devices served by a network device in a previous time period, for dividing terminal devices to be scheduled by the network device into a number of groups.

The network node 500 further includes an assigning unit 520 configured to assign a set of resources to each of the groups. The network node 500 further includes an initiating unit 530 configured to initiate scheduling of the terminal devices to be scheduled in each of the groups in the set of resources assigned to that group.

In an embodiment, the determining unit 510 can be configured to determine one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include GBR service and non-GBR service; and/or the channel conditions may include SINR, RSRP or RSRQ.

In an embodiment, the assigning unit 520 can be configured to divide total available resources evenly into the number of sets of resources and assigning each set of resources to one of the groups.

In an embodiment, the assigning unit 520 can be configured to: calculate a PDF of historical resource requirements of the terminal devices served by the network device in the previous time period; and divide total available resources into the number of sets of resources based on the PDF, and assign each set of resources to one of the groups.

In an embodiment, the determining unit 510 can be further configured to adjust the grouping policy based on a resource utilization for each of the groups. Additionally or alternatively, the assigning unit 520 can be further configured to adjust the set of resources assigned to each of the groups based on a resource utilization for each of the groups.

In an embodiment, the network node 500 may further include a calculating unit configured to, for each of the groups: calculate a number of CCEs required for scheduling the terminal devices to be scheduled in that group; and determine a size of CORESET based on the number of CCEs.

In an embodiment, the resources may include resources in time, frequency and/or spatial domain.

The determining unit 510, the assigning unit 520 and the initiating unit 530 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
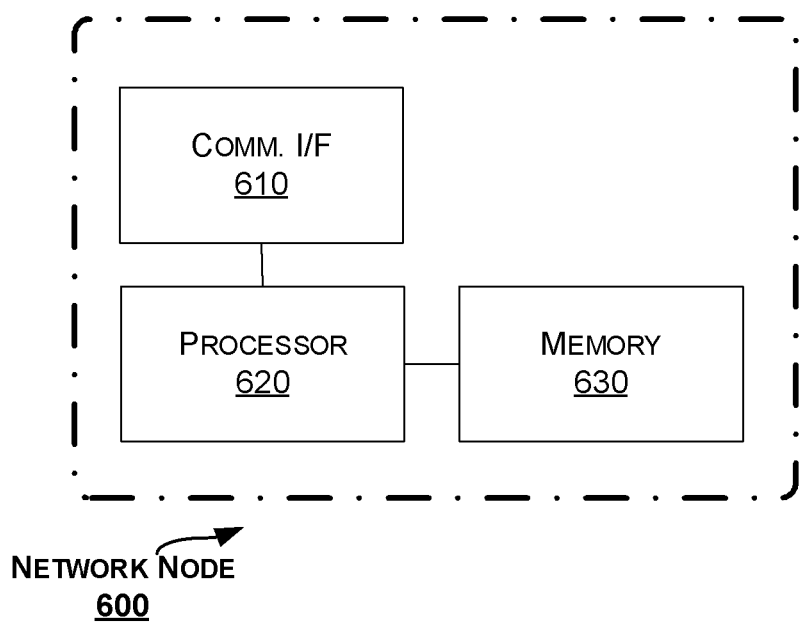
FIG. 6 is a block diagram of a network node according to another embodiment of the present disclosure.

FIG. 6 is a block diagram of a network node 600 according to another embodiment of the present disclosure.

The network node 600 includes a communication interface 610, a processor 620 and a memory 630. The memory 630 contains instructions executable by the processor 620 whereby the network node 600 is operative to perform the actions, e.g., of the procedure described earlier in conjunction with FIG. 2. Particularly, the memory 630 contains instructions executable by the processor 620 whereby the network node 600 is operative to: determine a grouping policy based on one or more attributes of terminal devices served by a network device in a previous time period, for dividing terminal devices to be scheduled by the network device into a number of groups; assign a set of resources to each of the groups; and initiate scheduling of the terminal devices to be scheduled in each of the groups in the set of resources assigned to that group.

In an embodiment, the operation of determining the grouping policy may include determining one or more of: the number of groups, a maximum number of terminal devices in each of the groups, or at least one of the one or more attributes that is associated with each of the groups.

In an embodiment, the one or more attributes may include: service types, buffer sizes or channel conditions.

In an embodiment, the service types may include GBR service and non-GBR service; and/or the channel conditions may include SINR, RSRP or RSRQ.

In an embodiment, the operation of assigning may include dividing total available resources evenly into the number of sets of resources and assigning each set of resources to one of the groups.

In an embodiment, the operation of assigning may include: calculating a PDF of historical resource requirements of the terminal devices served by the network device in the previous time period; and dividing total available resources into the number of sets of resources based on the PDF, and assigning each set of resources to one of the groups.

In an embodiment, the memory 630 may further contain instructions executable by the processor 620 whereby the network node 600 is operative to: adjust the grouping policy and/or the set of resources assigned to each of the groups based on a resource utilization for each of the groups.

In an embodiment, the memory 630 may further contain instructions executable by the processor 620 whereby the network node 600 is operative to, for each of the groups: calculate a number of CCEs required for scheduling the terminal devices to be scheduled in that group; and determine a size of CORESET based on the number of CCEs.

In an embodiment, the resources may include resources in time, frequency and/or spatial domain.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the network device 400 to perform the actions, e.g., of the procedure described earlier in conjunction with FIG. 1; or code/computer readable instructions, which when executed by the processor 620 causes the network node 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
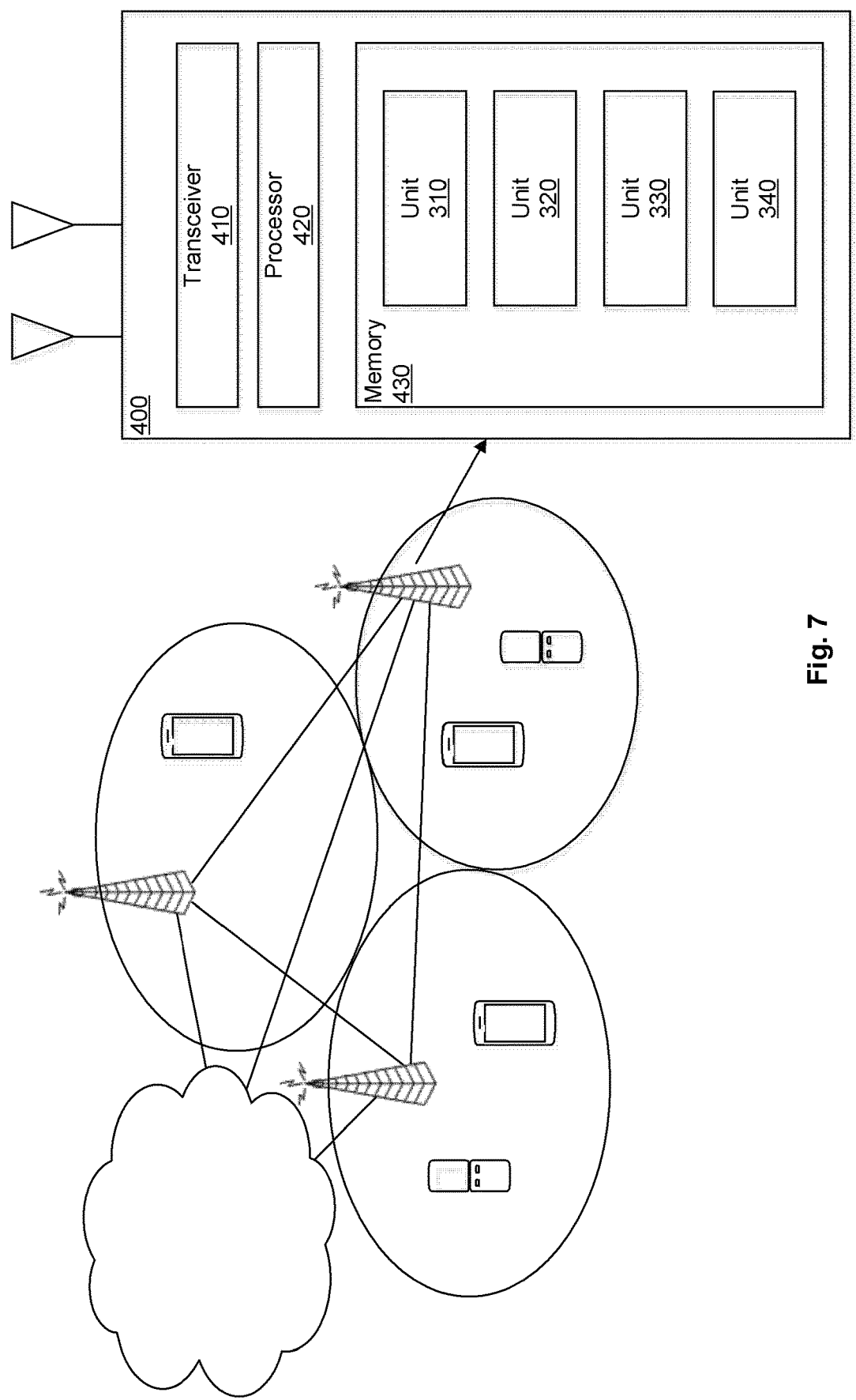
FIG. 7 is a schematic diagram showing an implementation example for particular embodiments of the solution described herein.

FIG. 7 is a schematic diagram showing an implementation example for particular embodiments of the solution described herein. As shown in FIG. 7, a network device, e.g., the network device 400 as described above in connection with FIG. 4, can be provided to serve (e.g., schedule) terminal devices within its coverage. The network device 400 can include a transceiver 410, a processor 420 and a memory 430. The memory 430 can contain instructions executable by the processor 420 whereby the network device 400 is operative to perform the method 100 as described above in connection with FIG. 1. For example, the memory 430 can contain instructions for implementing the units 310-340 as described above in connection with FIG. 3.

Figure 8:
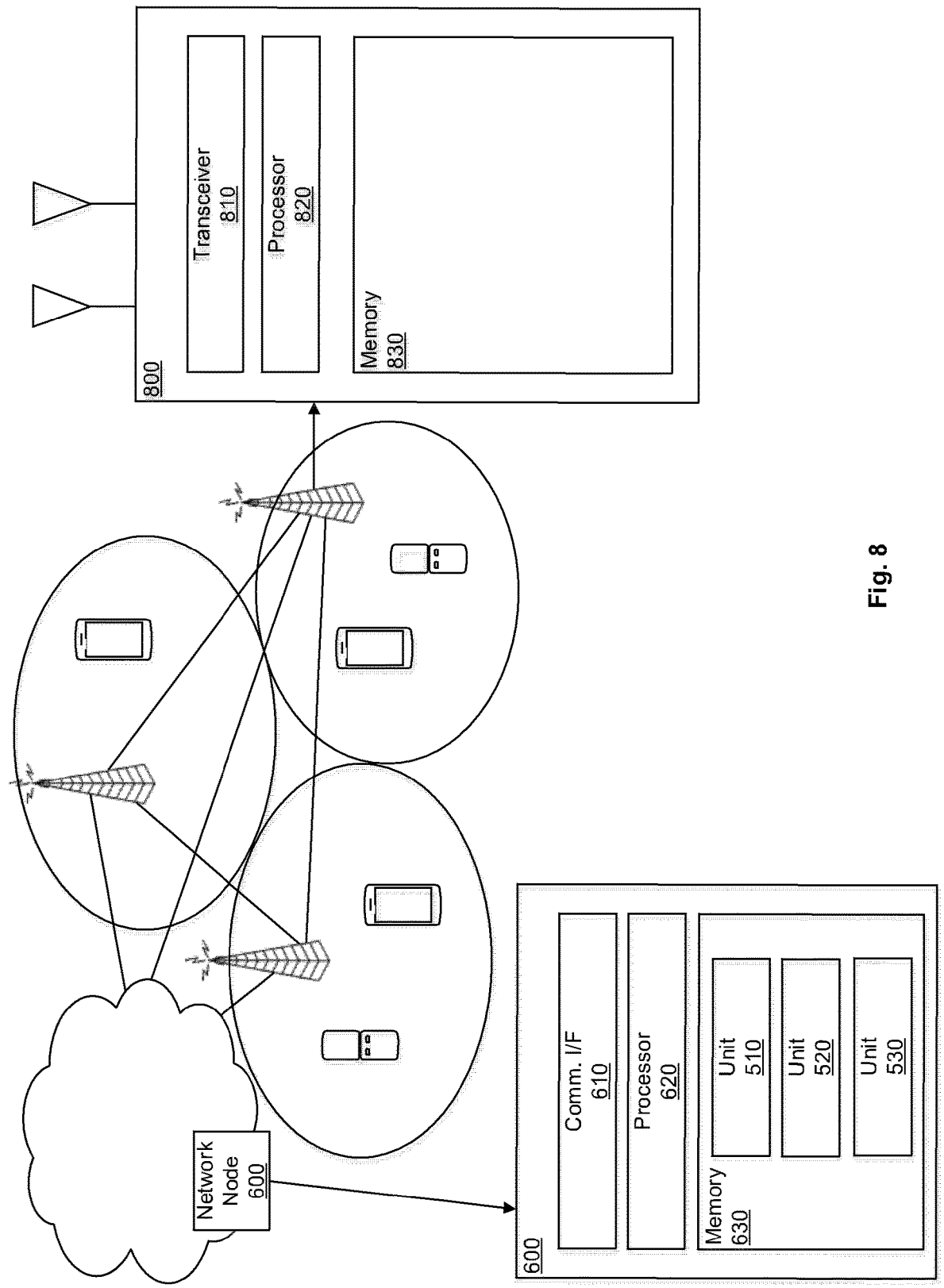
FIG. 8 is a schematic diagram showing another implementation example for particular embodiments of the solution described herein.

FIG. 8 is a schematic diagram showing an implementation example for particular embodiments of the solution described herein. As shown in FIG. 8, a network device 800 (e.g., an eNB or gNB) can be provided to serve (e.g., schedule) terminal devices within its coverage. A network node, e.g., the network node 600 as described above in connection with FIG. 6, is connected to the network device 800 via any appropriate communication network or protocol. The network node 600 can include a communication interface 610, a processor 620 and a memory 630. The memory 630 can contain instructions executable by the processor 620 whereby the network node 600 is operative to perform the method 200 as described above in connection with FIG. 2. For example, the memory 630 can contain instructions for implementing the units 510-530 as described above in connection with FIG. 5. The network device 800 can include a transceiver 810, a processor 820 and a memory 830. The memory 830 can contain instructions executable by the processor 820 whereby the network device 800 is operative to e.g., transmit to the network node 600 information on one or more attributes of terminal devices served by the network device 800 and receive from the network node 600 information on a grouping policy and an assignment of resources, such that the network device 800 can divide terminal devices to be scheduled into groups and schedule the terminal devices in each group in a set of resources assigned to that group (referring to the blocks 120 and 140 as described above in connection with FIG. 1).

Figure 9:
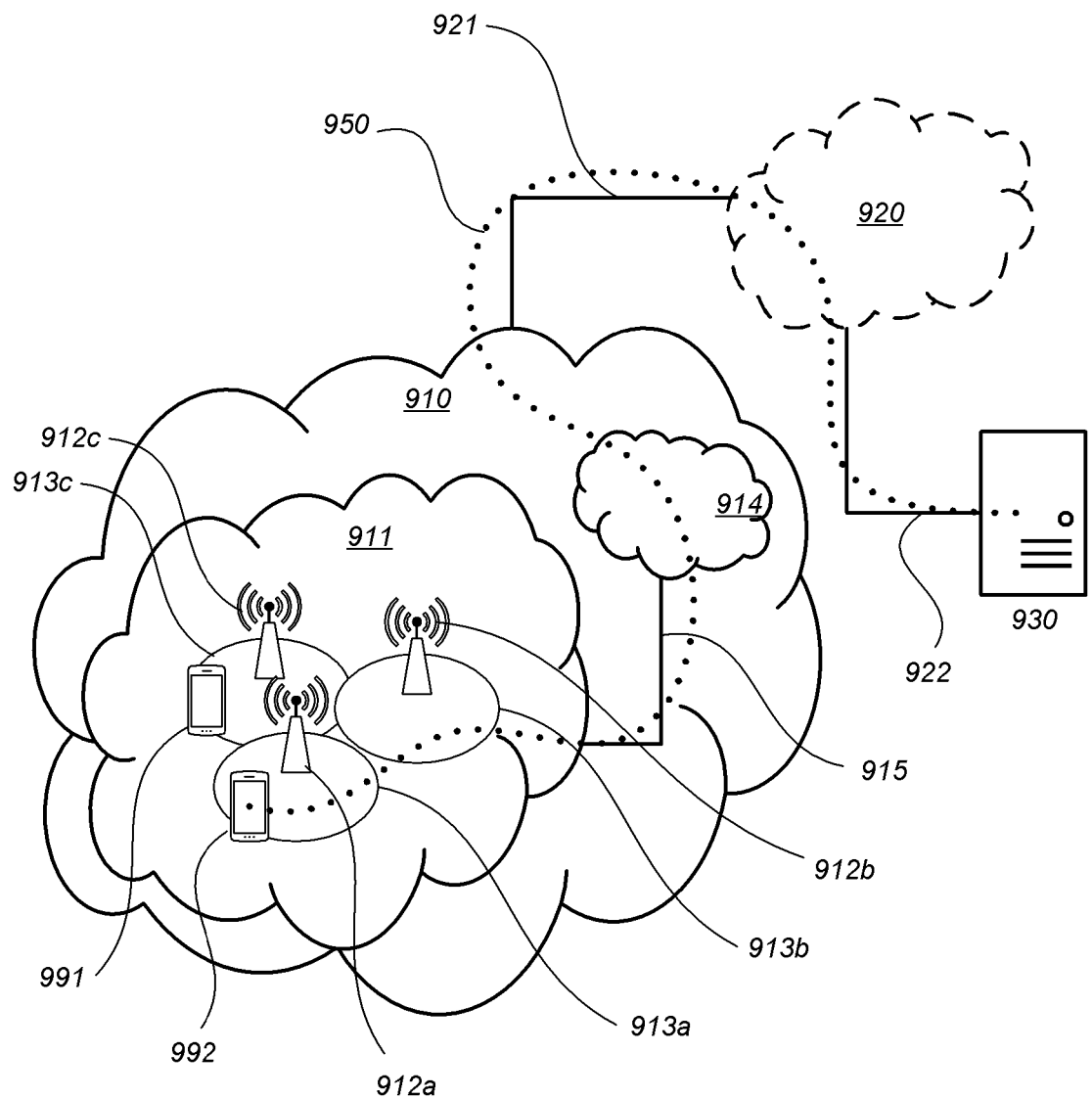
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000.

The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
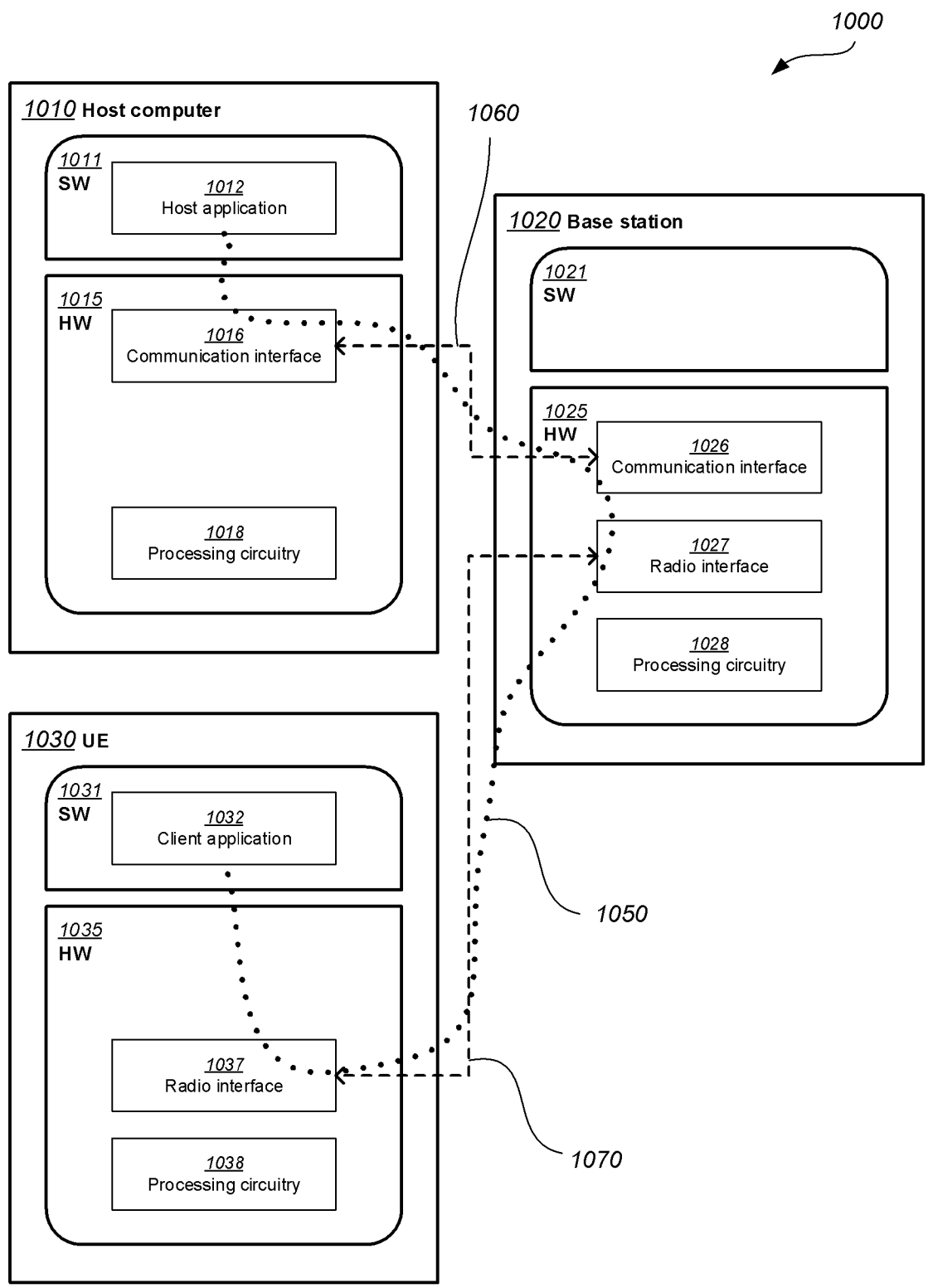
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve radio resource utilization and thereby provide benefits such as reduced user waiting time and increased data rate at the UE.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
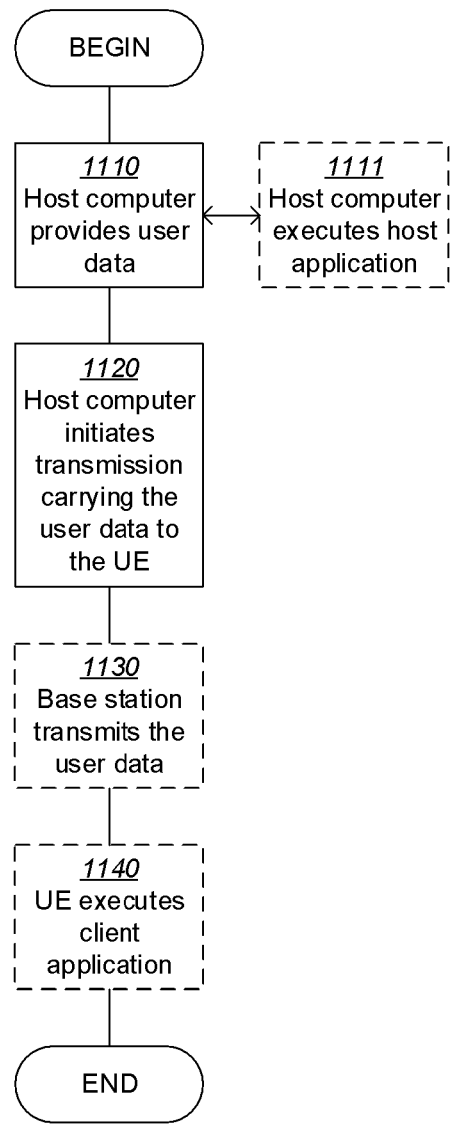
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
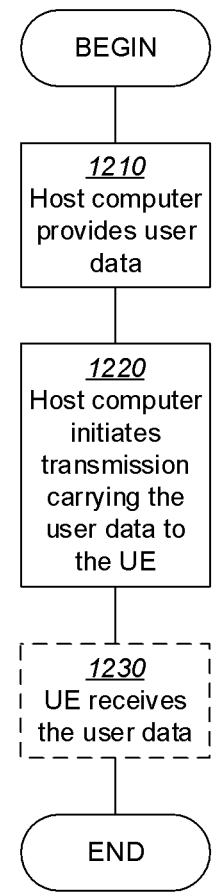

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
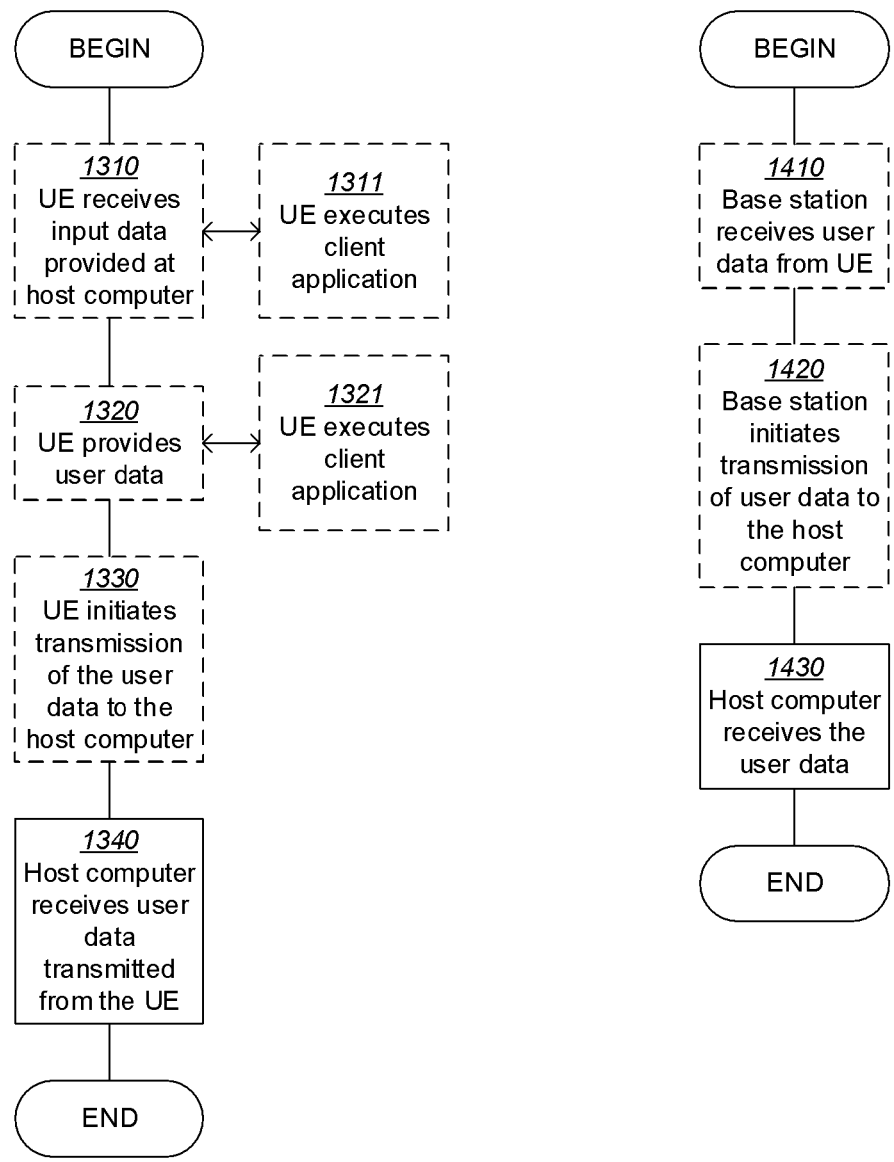

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for scheduling terminal devices, the method comprising:
 determining a grouping policy based on one or more attributes of terminal devices served by the network device in a previous time period;
 dividing terminal devices to be scheduled into a number of groups in accordance with the grouping policy;
 assigning a set of resources to each of the groups; and
 scheduling the terminal devices to be scheduled in each of the groups in the set of resources assigned to that group.

2. The method of claim 1, wherein said determining the grouping policy comprises determining one or more of:
 the number of groups,
 a maximum number of terminal devices in each of the groups, or
 at least one of the one or more attributes that is associated with each of the groups.

3. The method of claim 2, wherein the one or more attributes comprise:
 service types, buffer sizes, or channel conditions.

4. The method of claim 3, wherein
 the service types comprise Guaranteed Bit Rate (GBR) service and non-GBR service; and/or
 the channel conditions comprise Signal to Interference plus Noise Ratio (SINR), Reference Signal Received Power (RSRP), or Reference Signal Received Quality (RSRQ).

5. The method of claim 1, wherein said assigning comprises dividing total available resources evenly into the number of sets of resources and assigning each set of resources to one of the groups; or
 wherein said assigning comprises:
  calculating a Probability Density Function (PDF) of historical resource requirements of the terminal devices served by the network device in the previous time period; and
  dividing total available resources into the number of sets of resources based on the PDF, and assigning each set of resources to one of the groups.

6. The method of claim 1, wherein said scheduling comprises, for at least one of the groups: allocating the set of resources assigned to each of the at least one group to the terminal devices to be scheduled in that group with a periodicity.

7. The method of claim 6, wherein, for each of the at least one group, the periodicity is dependent on a maximum allowable delay for that group.

8. The method of claim 7, further comprising, for each of the at least one group:
 adjusting the maximum allowable delay for that group based on a resource utilization for that group.

9. The method of claim 1, further comprising:
 adjusting the grouping policy and/or the set of resources assigned to each of the groups based on a resource utilization for each of the groups.

10. The method of claim 1, further comprising, for each of the groups:
 calculating a number of Control Channel Elements (CCEs) required for scheduling the terminal devices to be scheduled in that group; and
 determining a size of Control Resource Set (CORESET) based on the number of CCEs.

11. The method of claim 1, wherein the terminal devices to be scheduled in each of the groups are scheduled sequentially.

12. The method of claim 1, wherein the terminal devices to be scheduled in at least one of the groups are scheduled in parallel with the terminal devices to be scheduled in at least another one of the groups.

13. A network device comprising a transceiver, a processor and a memory, the memory comprising instructions executable by the processor to:
 determine a grouping policy based on one or more attributes of terminal devices served by the network device in a previous time period;
 divide terminal devices to be scheduled into a number of groups in accordance with the grouping policy;
 assign a set of resources to each of the groups; and
 schedule the terminal devices to be scheduled in each of the groups in the set of resources assigned to that group.

14. A method in a network node for scheduling terminal devices, comprising:
 determining a grouping policy based on one or more attributes of the terminal devices served by a network device in a previous time period, for dividing the terminal devices to be scheduled by the network device into a number of groups;
 assigning a set of resources to each of the groups; and
 initiating scheduling of the terminal devices to be scheduled in each of the groups in the set of resources assigned to that group.

15. The method of claim 14, wherein said determining the grouping policy comprises determining one or more of:
 the number of groups,
 a maximum number of terminal devices in each of the groups, or
 at least one of the one or more attributes that is associated with each of the groups.

16. The method of claim 15, wherein the one or more attributes comprise: service types, buffer sizes, or channel conditions.

17. The method of claim 16, wherein
 the service types comprise Guaranteed Bit Rate (GBR) service and non-GBR service; and/or
 the channel conditions comprise Signal to Interference plus Noise Ratio (SINR), Reference Signal Received Power (RSRP), or Reference Signal Received Quality (RSRQ).

18. The method of claim 14, wherein said assigning comprises dividing total available resources evenly into the number of sets of resources and assigning each set of resources to one of the groups; or
  wherein said assigning comprises:
    calculating a Probability Density Function (PDF) of historical resource requirements of the terminal devices served by the network device in the previous time period; and
    dividing total available resources into the number of sets of resources based on the PDF, and assigning each set of resources to one of the groups.

19. The method of claim 14, further comprising:
  adjusting the grouping policy and/or the set of resources assigned to each of the groups based on a resource utilization for each of the groups.

20. The method of claim 14, further comprising, for each of the groups:
  calculating a number of Control Channel Elements (CCEs) required for scheduling the terminal devices to be scheduled in that group; and
  determining a size of Control Resource Set (CORESET) based on the number of CCEs.

\* \* \* \* \*